(12) United States Patent
Kim et al.

(10) Patent No.: US 6,594,377 B1
(45) Date of Patent: Jul. 15, 2003

(54) IRIS RECOGNITION SYSTEM

(75) Inventors: Bum Chul Kim, Sungnam (KR); Jang Jin Chae, Kunpo (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/479,885

(22) Filed: Jan. 10, 2000

(30) Foreign Application Priority Data

Jan. 11, 1999 (KR) .................................................. 99/418

(51) Int. Cl.$^7$ ................................................ G06K 9/00
(52) U.S. Cl. ...................................... 382/117; 359/210
(58) Field of Search ................................ 382/115, 117, 382/118, 291; 351/206, 207, 208, 210, 221; 359/210, 225, 226; 348/77, 78, 143, 156; 340/5.52, 5.53, 5.82, 5.83

(56) References Cited

U.S. PATENT DOCUMENTS

| | | | |
|---|---|---|---|
| 5,291,560 A | | 3/1994 | Daugman ........................ 382/2 |
| 5,572,596 A | | 11/1996 | Wildes et al. ................ 382/117 |
| 5,717,512 A | * | 2/1998 | Chmielewski, Jr. et al. 359/210 |
| 6,055,322 A | * | 4/2000 | Salganicoff et al. ......... 382/117 |
| 6,289,113 B1 | * | 9/2001 | McHugh et al. ............. 382/117 |
| 6,320,610 B1 | * | 11/2001 | Van Sant et al. ............ 348/143 |

* cited by examiner

*Primary Examiner*—Samir Ahmed
(74) *Attorney, Agent, or Firm*—Fleshner & Kim, LLP

(57) ABSTRACT

The present invention relates to an iris recognition system which can extract an iris image of the user, by upwardly and downwardly rotating around a hinge bracket in order to be exactly rapidly controlled to a position of the user's eyes. The conventional iris recognition system has disadvantages in that the system size is huge, the time for obtaining the iris image is quite long, and the system is difficult to handle. Accordingly, the iris recognition system includes: an optical imager for obtaining an iris image of the user at an optimal state, an inner casing at which the optical imager is disposed, an outer casing for supporting the inner casing, and surrounding surfaces of the inner casing, except for the front surface thereof, a control unit for receiving iris images outputted from the optical imager, and controlling the optical imager and a hinge bracket disposed at both side portions of the outer casing, for supporting the inner casing, and enabling the inner casing to upwardly and downwardly rotate. As a result, the system size is small, and the iris image can be easily rapidly precisely obtained.

19 Claims, 3 Drawing Sheets

IRIS RECOGNITION SYSTEM

BACKGROUND OF THE INVENTION

1. Field of the Invention

The present invention relates to an iris recognition system, and in particular to an iris recognition system which can extract an iris image of a user, by upwardly and downwardly rotating around a hinge bracket in order to be exactly rapidly controlled to a position of the user's eyes.

2. Description of the Background Art

In an automatic access control system and an automatic commercial transaction system using an internet, the user's biological characteristics have been recently utilized in order to identify the user. The biological characteristics are fingerprints, voice, retinas, faces, irises and the likes. Especially, every human being has different irises, and the irises are impossible to imitate and not varied for the entire life. Thus, the characteristics of the irises is applied to the systems, and used to identify the user.

Here, the iris implies a peripheral portion of a pupil of the animal's eye. The iris is a muscle controlling opening/closing of the pupil, and serves to control an amount of light which is externally incident on eyeball.

In general, the human being's eyes have been generally formed for the six months of pregnancy. Thereafter, a hole is formed at the pupil, and wrinkles are outwardly generated in a chaos pattern. The growth of the wrinkles is stopped within a few years after birth, and the wrinkles are not varied for the whole life. Accordingly, the iris including the wrinkles has its own pattern. Generally, the right iris of a person is different from the left iris of the person, and even identical twins have different irises as well.

Therefore, the iris recognition is to identify the shape of the iris having a specific pattern. That is, the irises photographed by a video camera are image-processed, and stored in a data base. Thereafter, a pattern of a currently-inputted iris is compared with that of the stored iris, thereby identifying the user having the currently-inputted iris.

An iris recognition system and a method thereof have been disclosed in the U.S. Pat. Nos. 4,641,349, 5,291,560 and 5,572,586.

Especially, the U.S. Pat. Nos. 4,641,349 and 5,291,560 relate to an iris imager for extracting an iris image, a system for analyzing the extracted iris image and an algorithm for generating an iris code of 256 bytes by using the iris image.

FIG. 1 is a cross-sectional view illustrating a conventional optical imager. As shown therein, the conventional optical imager includes: a camera 1 photographing eyes of the human beings, an optical lens 2 gathering light inputted to the camera 1, a light source unit 6 emitting light in order to photograph the eyes of the human beings, an LCD unit 4 displaying an image of the eyes of the user photographed by the camera 1, and a beam splitter 3 reflecting light incident from the eyes of the user to the camera 1, and passing an image of the eyes of the user incident from the LCD unit 4 toward the eyes of the user.

The conventional optical iris imager has a disadvantage in that a size of the system is large. In addition, the camera does not have an automatic zoom and focus function, and accordingly the user must directly focus on the camera at a predetermined distance.

As a result, it is difficult to focus the position and shape of the eyes of the user on the camera.

In addition, when the shape of the eyes of the user is photographed, a large amount of visible light is incident on the camera, and thus the image of the eyes cannot be exactly obtained.

Accordingly, the conventional optical iris imager has a low iris recognition rate.

A device for overcoming the aforementioned disadvantages has been described in the U.S. Pat. No. 5,572,596 (owned by Davio Sarnoff Research Center, Inc.). It uses an algorithm that traces his/her irises of the user.

However, although this system is convenient, three cameras for searching for the head and eyes of the human being and extracting the iris image, a device for controlling an angle of a mirror, and a plurality of high-power infrared light source units for lighting a peripheral region of the iris are necessary, thereby increasing the system size and cost.

SUMMARY OF THE INVENTION

Accordingly, it is a primary object of the present invention to provide a small-sized and low cost iris recognition system which can be easily operated, and which can exactly extract an iris image for a short time.

It is another object of the present invention to provide an iris recognition system which can extract an iris image of the user, by upwardly and downwardly rotating around a hinge bracket in order to be exactly rapidly controlled to a position of the user's eyes.

In order to achieve the above-described objects of the present invention, there is provided an iris recognition system including, an optical imager obtaining an iris image of the user at an optimal state, an inner case at which the optical imager is disposed, an outer case supporting the inner case, and surrounding the surfaces of the inner case, except for the front surface thereof, a control unit receiving a signal outputted from the optical imager, and controlling the optical imager according to the signal, and a hinge bracket disposed at both side portions of the outer case, for supporting the inner case, and enabling the inner case to upwardly and downwardly rotate.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The constitution and operation of an iris recognition system in accordance with the present invention will now be described.

Figure 1:
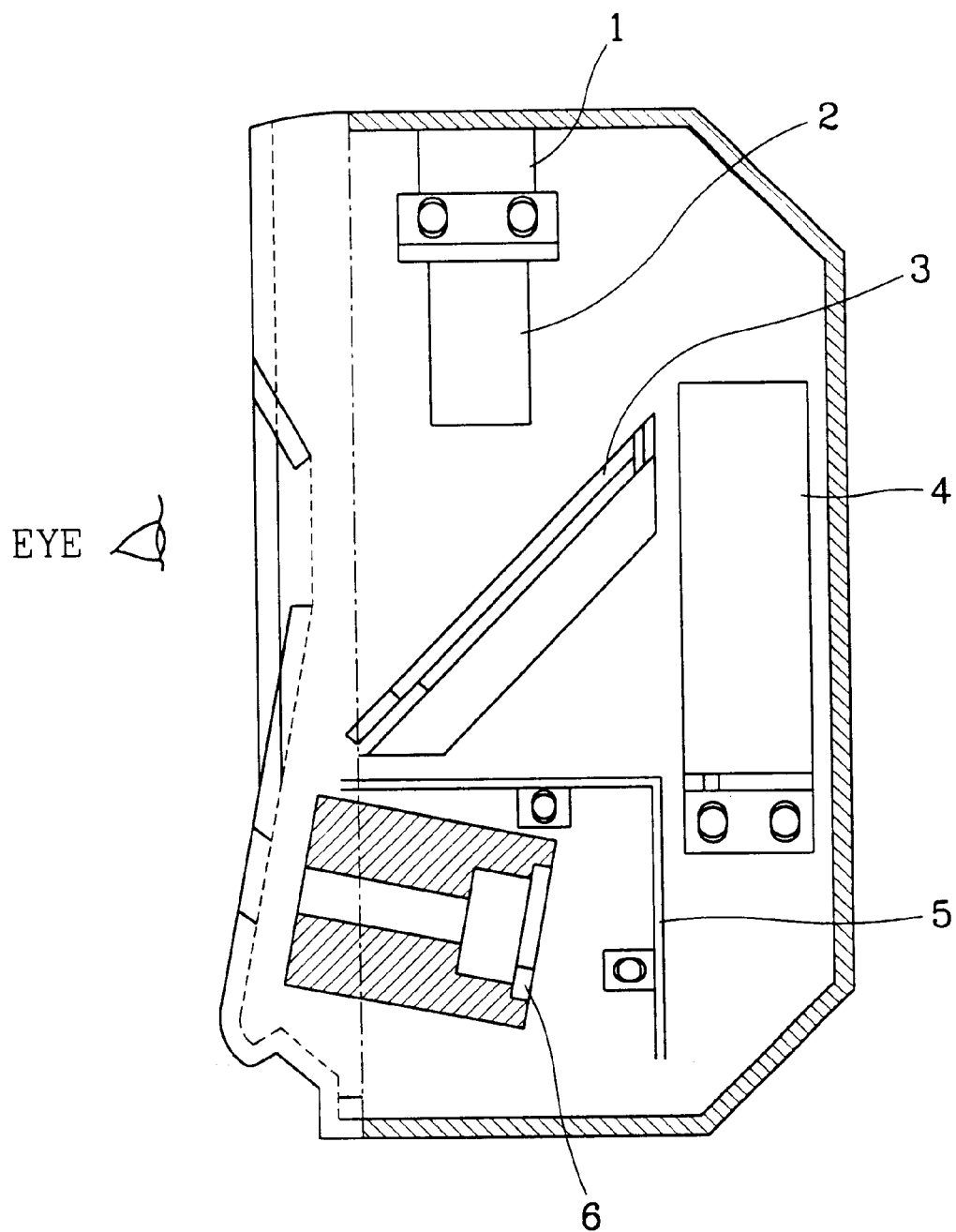
FIG. 1 is a cross-sectional view illustrating a conventional optical imager.
Figure 2:
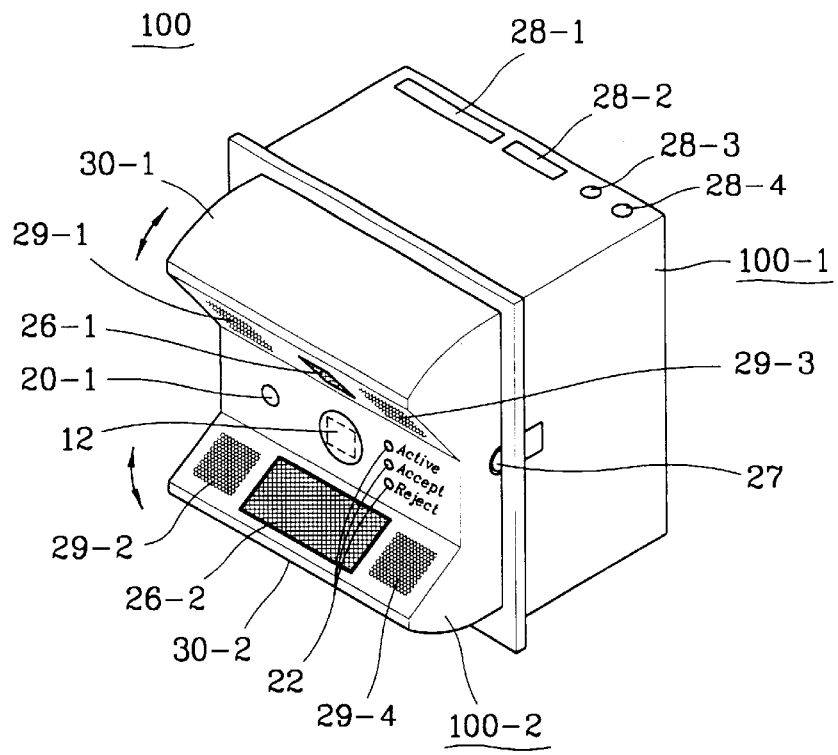
FIG. 2 is a perspective view illustrating an optical imager in accordance with the present invention.

FIG. 2 is a perspective view illustrating an outer casing 100-1 and a front outer case 100-2 of an optical imager 100 of the iris recognition system in accordance with the present invention.

The outer casing 100-1 includes a parallel port 28-1, a serial port 28-2, a video port 28-3 and a power port 28-4. In addition, the front outer case 100-2 includes, a hinge bracket 27 supporting the front outer casing 100-2 in order to rotate centering around the hinge bracket 27, an upper slide unit 30-1 and a lower slide unit 30-2 sliding into an inner portion of the outer casing 100-1, centering around the hinge bracket 27, push units 29-1, 29-2, 29-3, 29-4 which the user pushes so that the front outer case 100-2 can rotate centering around the hinge bracket 27, an optical window 12 receiving light reflected from the eyes of the human being, infrared filters 26-1, 26-2 intercepting light, except for the infrared light an outside speaker protection net 20-1 externally connecting a speaker 20-2 installed inside, and an outside indicator 22 indicating a result with predetermined lamps after identifying the iris of the user.

So that the user can identify his/her eyes with an optical axis of a camera 10, the front outer casing 100-2 can be upwardly and downwardly rotated from a balanced position by approximately+/−30 degrees, centering around the hinge bracket 27, according to pushing of the push units 29-1, 29-2, 29-3, 29-4.

According to the preferred embodiment of the present invention, it is exemplified that the user rotates the front outer casing 100-2 by pushing the units 29-1, 29-2, 29-3, 29-4. However, for example, the front outer casing 100-2 can be rotated by using a power source driven by electricity, such as a motor.

Also, the front outer casing 100-2 is designed to be concave in regard to the front surface in order to reduce the system size.

Figure 3:
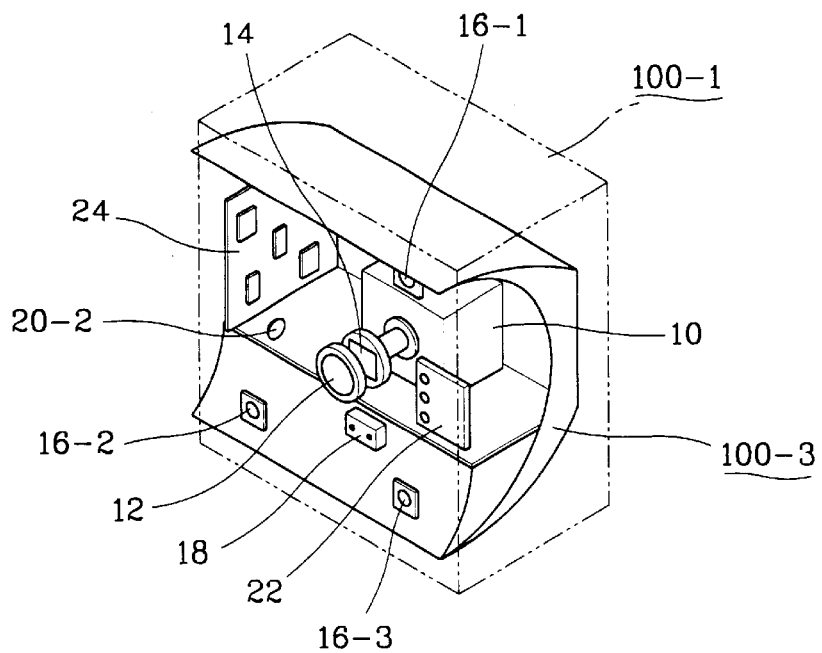
FIG. 3 is an inside perspective view illustrating the optical imager in accordance with the present invention.

FIG. 3 is an inside perspective view illustrating the optical imager of the iris recognition system in accordance with the present invention. There is depicted in more detail an inner casing 100-3 disposed at the back of the front outer casing 100-2, for upwardly and downwardly rotating with the front outer casing 100-2, centering around the hinge bracket 27.

The inner casing 100-3 includes a distance detector 18 measuring a distance when the user accesses to the front outer casing 100-2, an optic window 12 receiving light reflected from the eyes of the human being, except for the ultraviolet light, a cold mirror 14 receiving the light incident through the optical window 12, and passing the infrared light, except for the visible light, a camera 10 receiving the infrared light incident through the cold mirror 14, and photographing the eyes of the human being, light source units 16-1, 16-2, 16-3 emitting the infrared light in order to photograph the iris of the user by the camera 10, an outside indicator 22/speaker 20-2 comparing the iris of the user photographed by the camera 10 with an image data which is previously stored in a data base, and visually/audibly informing that the user is a right one, and an optical imager driving unit 24 controlling various circuit units arranged at the inner casing 100-3. Here, the optical imager driving unit 24 receives control signals from a control unit to be discussed later, and drives the distance detector 18, the camera 10 and the light source units 16-1, 16-2, 16-3, an outside indicator 22 and speaker 20-2 which are arranged at the inner case 100-3.

According to the embodiment of the present invention, the components are arranged as shown in FIG. 3. However, the position of the components may be varied. In addition, according to the present invention, the distance detector 18 measures a distance by using the infrared light. However, a detector using an ultrasonic wave may be employed.

The speaker 20-2 can inform the iris recognition result by a sound or voice, and can be operated simultaneously with the outside indicator 22.

The light source units 16-1, 16-2, 16-3 are respectively at the upper side of the camera 10, and at both bottom sides of the camera 10, thereby forming an three infrared LED boards shape. In the respective light sources 16-1~-16-3, a plurality of infrared chips (for example, eight infrared chips) having a different wavelength are formed as one package. So that the camera can photograph the iris image by a regular light strength, an amount of the current flowing into the light source units is controlled according to a distance between the camera and the iris, thereby adjusting a strength of the infrared light. Here, the infrared light outputted from the light source units is externally outputted through the infrared filters 26-1 or 26-2.

The cold mirror 14 reflects the visual light, and passes only the infrared light, thereby preventing an influence by the external light. Especially, the position where the iris must be positioned is marked on the cold mirror 14, and thus the user can easily confirm the position of his/her eyes.

Figure 4:
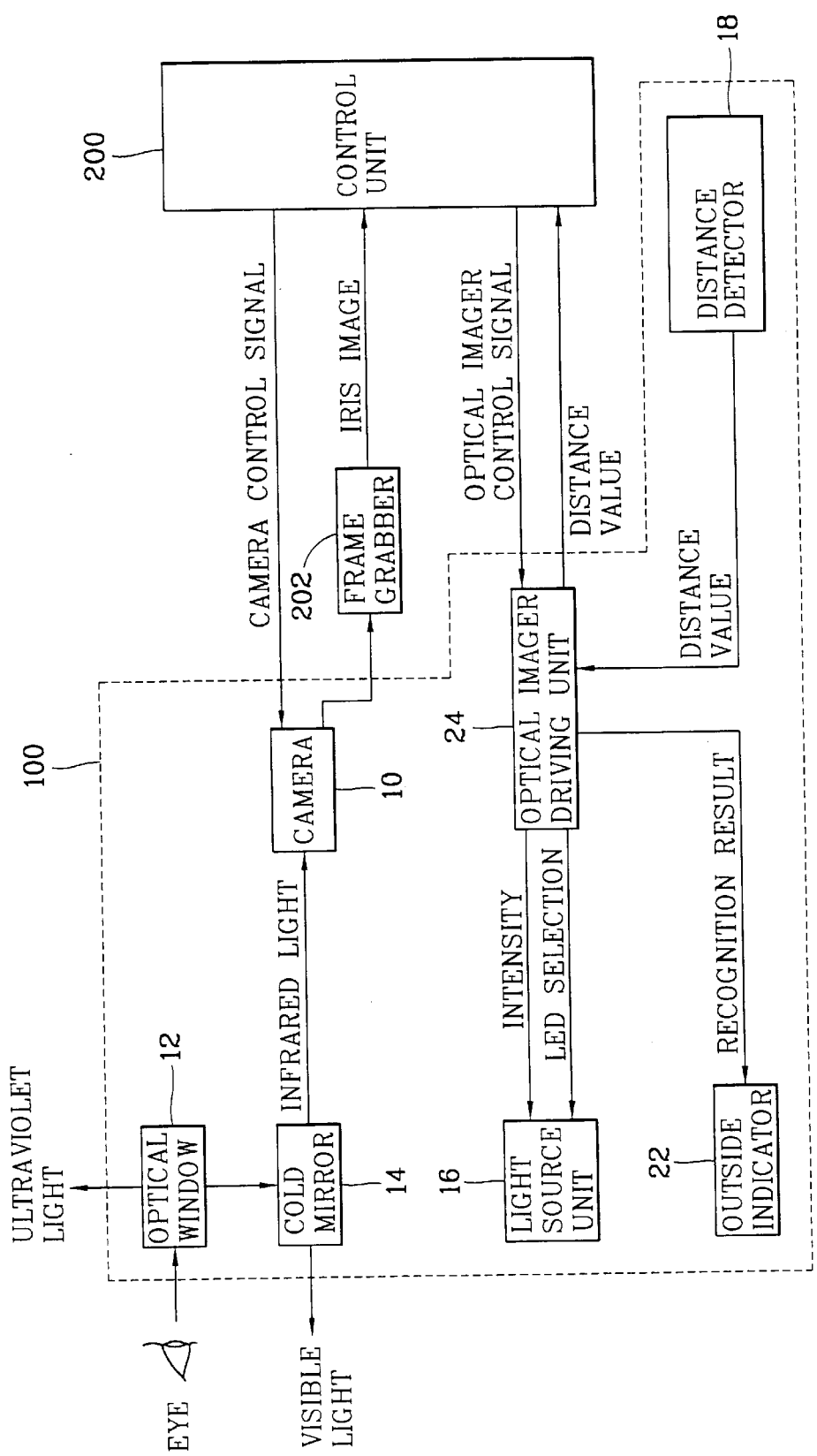
FIG. 4 is a structure view illustrating an iris recognition system in accordance with the present invention.

FIG. 4 is a structure view illustrating the iris recognition system in accordance with the present invention. The iris recognition system includes a frame grabber 202 receiving an image signal outputted from the optical imager 100 as shown in FIG. 3, and a control unit 200 receiving and processing the image signal outputted from the frame grabber 202, comparing the IrisCodes™ generated from the currently inputted iris image with the stored IrisCodes™ and controlling the optical 100 and the camera 10.

The operation of the iris recognition system according to the present invention will now be described in more detail.

When the user accesses to the front outer case 100-2, the distance detector 18 measures a distance between the user and the optical imager, and transmits the measured distance value to the controller 200 through the optical imager driving unit 24. The control unit 200 judges whether the eye of the user is positioned within a predetermined operational range.

When it is judged that the user is positioned within the operational range, the control unit 200 outputs the control signal to the optical imager 100, thereby automatically enabling the optical imager 100. That is, the camera 10 prepares for capturing the iris image of the user, and simultaneously optical imager driving unit 24 outputs to the outside indicator 22 an active signal informing that the optical imager 100 is enabled.

Thereafter, the user pushes one of the push units 29-1, 29-2, 29-3, 29-4, thereby rotating the inner case 100-3 connected with the front outer case 100-2. When the eyes of the user are positioned at the optical axis of the camera 10 through the optical window 12, the cold mirror 14 reflects the visible light, and passes only the infrared light. At this time, the position at which the iris must be positioned is marked on the cold mirror 14, and thus the user can easily confirm whether his/her eyes are precisely positioned at the optical axis of the camera.

When the user accesses to the optical imager, and is positioned within a operatinal range, the distance detector 18 detects a distance signal having a small variation width corresponding to the distance, and outputs it to the control unit 200 through the optical imager driving unit 24. The control unit 200 receives the distance value, computes a zoom-in/zoom-out value and a focus value by using a property table of the camera according to a value corresponding to the distance value, and controls a zoom motor and a focus motor of the camera according to the computed value.

That is, the control unit 200 decides a zoom magnification from the zoom magnification table of the camera according to the previously-set distance by using the distance value between the camera and the iris, transmits the control signal to the camera, and controls the zoom motor of the camera. Accordingly, the zoom lens is directly moved, the focus lens is moved to a corresponding position by controlling the focus motor, and thus the focus is directly controlled. As a result, the focusing speed is increased.

On the other hand, when the optical imager driving unit 24 alternately controls the light source units installed at the upper and lower sides of the camera 10 by using the measured distance value, the camera 10 photographs the iris image, and transmits the iris image to the control unit through the frame grabber. Thereafter, the control unit 200 selects the iris image having smallest specular reflection among the inputted iris images, and outputs the control signal to the optical imager driving unit 24 in order to control the operated light source unit. According to the control signal outputted from the control unit 200, the optical imager driving unit 24 selects one of the light source units, and supplies the current in proportion to the measured distance value to the infrared LED of the light source unit. Therefore, the iris image photographed by the camera 10 can be extracted by the regular light (intensity of illumination), regardless of the distance between the iris and the camera.

Accordingly, when the eye of the user is positioned at the optical axis of the camera through the optical window, the infrared light passing through the optical window and the cold mirror reaches to the camera, thereby automatically photographing the iris of the user.

The iris image photographed as described above is outputted to the frame grabber 202 through the video port 28-3. The frame grabber 202 processes the iris image to be easily analyzed, and outputs it to the control unit 200. The control unit 200 analyzes the inputted iris image, compares it with the previously-stored iris image in the data base, and recognizes the iris of the user.

Therefore, the control unit 200 informs the user of the iris recognition result through the parallel port 28-1 of the outer casing 100-1 by using the outside indicator 22 and/or speaker 20-2. Here, the speaker outputs the sound or voice.

The iris recognition system in accordance with the present invention enables the inner case of the optical imager 100 to rotate centering around the hinge bracket. Accordingly, when the user easily positions his/her irises at the optical axis of the camera, the strength of illumination incident on the optical window is constantly maintained on the basis of the distance value between the iris of the user and the camera, which is detected by the distance measurement detector, and at the same time the zoom lens and the focusing lens are directly controlled. As a result, the iris image can be precisely rapidly extracted.

In addition, in accordance with the present invention, the front outer case of the iris recognition system is concave according to the user's taste. There are employed one distance measurement detector, one camera and three light source units, thereby reducing the size and the cost of the system.

In addition, in accordance with the present invention, the front outer casing of the iris recognition system is concave according to the user's taste. There are employed one distance measurement detector, one camera and three light source units, thereby reducing the size and cost of the system.

Moreover, in accordance with the iris recognition system of the present invention, the optical window, the cold mirror and the camera lens are disposed in parallel, thereby easily aligning the optical axis. Also, the recognition rate of the iris images photographed by the camera is improved by passing the infrared light and intercepting the visible light and ultravilot light.

Furthermore, the infrared LED having a small output power is employed for the light source units, and thus less stimulates the eyes of the user compared with a light source units used by the conventional optical imagers. The iris is exactly photographed and recognized, regardless of existence or absence of the visible light. When the iris image is recognized, the iris recognition result is informed through the speaker and/or the outside indicator.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An iris recognition system comprising:
   an optical imager for obtaining an iris image of the user at an optimal state;
   an inner case surrounding the optical imager;
   an outer casing for supporting the inner case, and surrounding all surfaces of the inner case, except for the front surface thereof;
   a control unit for receiving iris images outputted from the optical imager and controlling the optical imager; and
   a hinge bracket disposed at both side portions of the outer case, for supporting the inner case, and enabling the inner case to upwardly and downwardly rotate within the outer case.

2. The iris recognition system according to claim 1, wherein the optical imager comprises:
   a camera disposed at a predetermined position of the inner case, for photographing the iris of the user under the control of the control unit;
   a plurality of light source units provided separately from the camera by a predetermined distance, for emitting the light in order to photograph the iris of the user by the camera;
   a distance measurement detector for detecting a distance between the iris of the user and the camera; and
   an optical imager driving unit for receiving a distance signal from the distance measurement detector, outputting it to the control unit, and controlling the plurality of light source units under the control of the control unit.

3. The iris recognition system according to claim 1, wherein the inner case further comprises a front outer case for covering the front surface thereof.

4. The iris recognition system according to claim 3, wherein a middle portion of the front outer casing is concave toward the inner case.

5. The iris recognition system according to claim 3, wherein the front outer case comprises a push unit region, the inner case being rotated centering around the hinge bracket when the user pushes the push unit region.

6. The iris recognition system according to claim 1, wherein the control unit receives a distance measurement value from a distance measurement detector, judges whether the user is positioned at an operational range, and automatically enables the optical imager when the user is positioned at the operational range.

7. The iris recognition system according to claim 1, wherein the optical imager further comprises an optical window and a cold mirror for positioning the eyes of the user, the optical window, the cold mirror and the camera lens being provided in parallel.

8. The iris recognition system according to claim 7, wherein the cold mirror reflects the visible light, and passes only the infrared light over a predetermined wavelength.

9. The iris recognition system according to claim 1, wherein the plurality of light source units comprise:

a first light source unit disposed at a upper side of the camera; and second and third light source units disposed at the right and left bottom sides of the camera, respectively.

10. The iris recognition system according to claim 1, wherein the control unit receives a measured distance signal from the optical imager driving unit, and controls the current flowing into the light source unit through the optical imager.

11. The iris recognition system according to claim 1, wherein the control unit alternately operates the light sources of the light source unit, and controls the optical imager driving unit to select the light source generating the iris image having the smallest specular reflection.

12. The iris recognition system according to claim 1, wherein the control unit further comprises a frame grabber for receiving and processing the iris image photographed by the camera.

13. The iris recognition system according to claim 1, wherein the optical imager further comprises an outside indicator for informing the user of the result by a predetermined sound or light, when the user has a previously-registered iris.

14. The iris recognition system according to claim 13, wherein the outside indicator is a speaker and an LED indicator.

15. An iris recognition system comprising:

an optical imager that determines an iris image;

an inner case having a first prescribed shape containing the optical imager; and an outer case having a second prescribed shape, the inner case being rotatable within the outer case such that the optical imager rotates with the rotation of the inner case within the outer case.

16. The iris recognition system of claim 15, wherein the outer case includes a hinge supporting the inner case.

17. The iris recognition system of claim 15 wherein a front end of the inner case protrudes outwardly from front surface of the outer case.

18. The iris recognition system of claim 17, wherein the front end of the inner case has a substantially concave shape.

19. The iris recognition system of claim 15, further comprising;

a controller for receiving an iris image outputted from the optical imager and controlling the optical imager.

* * * * *